Aug. 13, 1963  J. AIRLIE  3,100,411
PRESS TOOLS
Filed Feb. 8, 1960  6 Sheets-Sheet 2
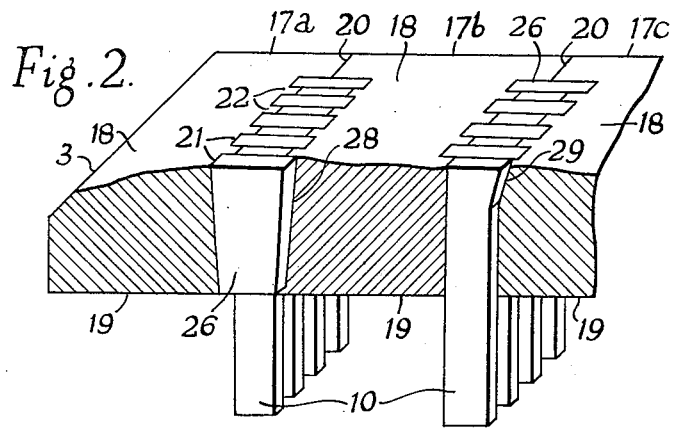
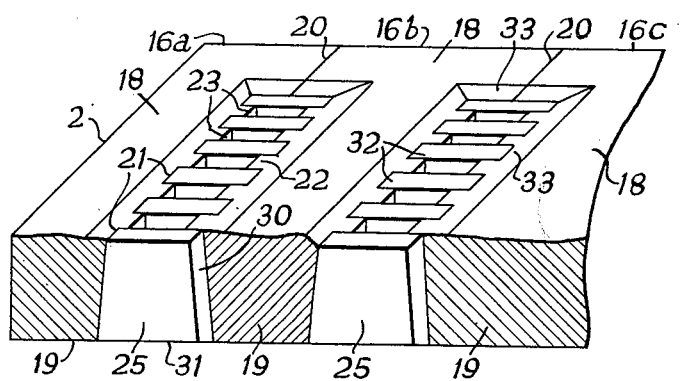
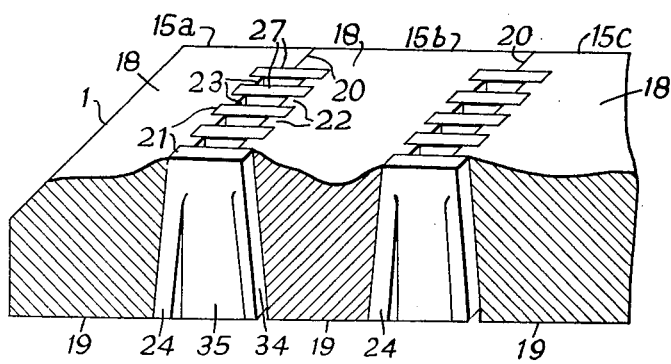
Fig. 2.
INVENTOR
John Airlie
BY
Karl W. Flocks
ATTORNEY

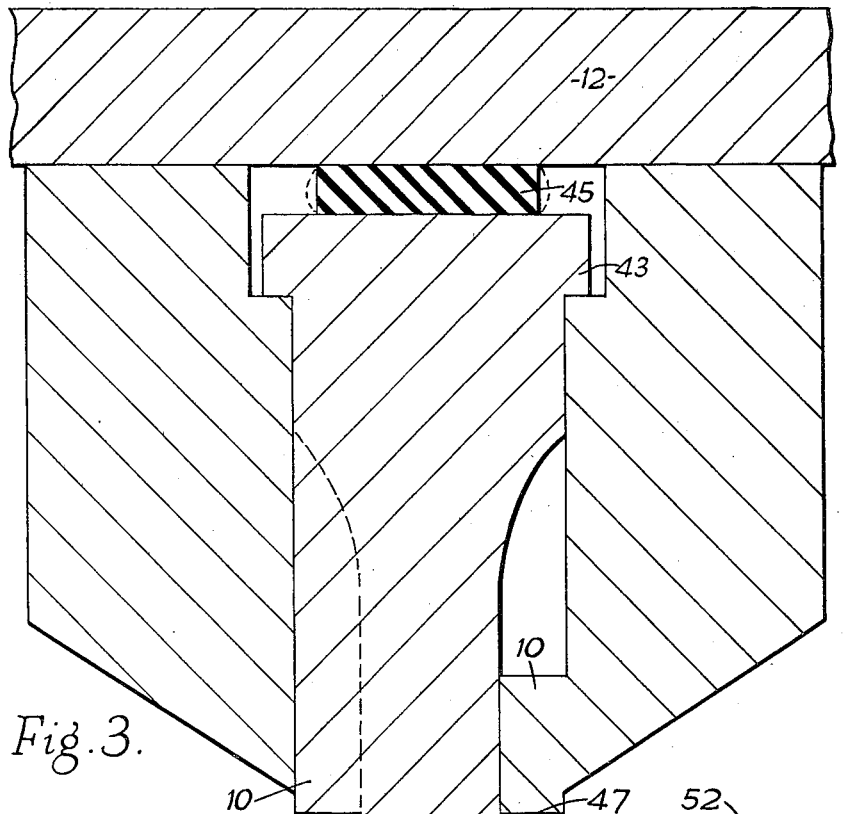
Fig. 3.
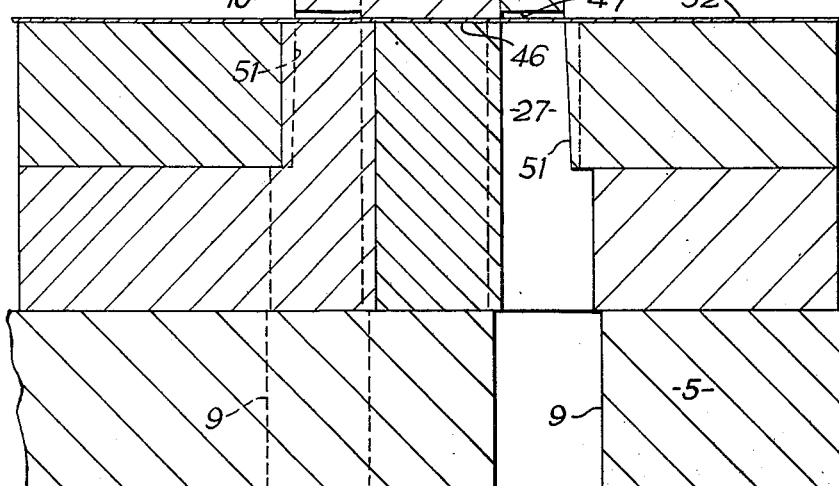
INVENTOR
John Airlie
BY
Karl W. Flocks
ATTORNEY

Aug. 13, 1963

J. AIRLIE 3,100,411

PRESS TOOLS

Filed Feb. 8, 1960

INVENTOR
John Airlie
BY
Ken W. Flocks
ATTORNEY

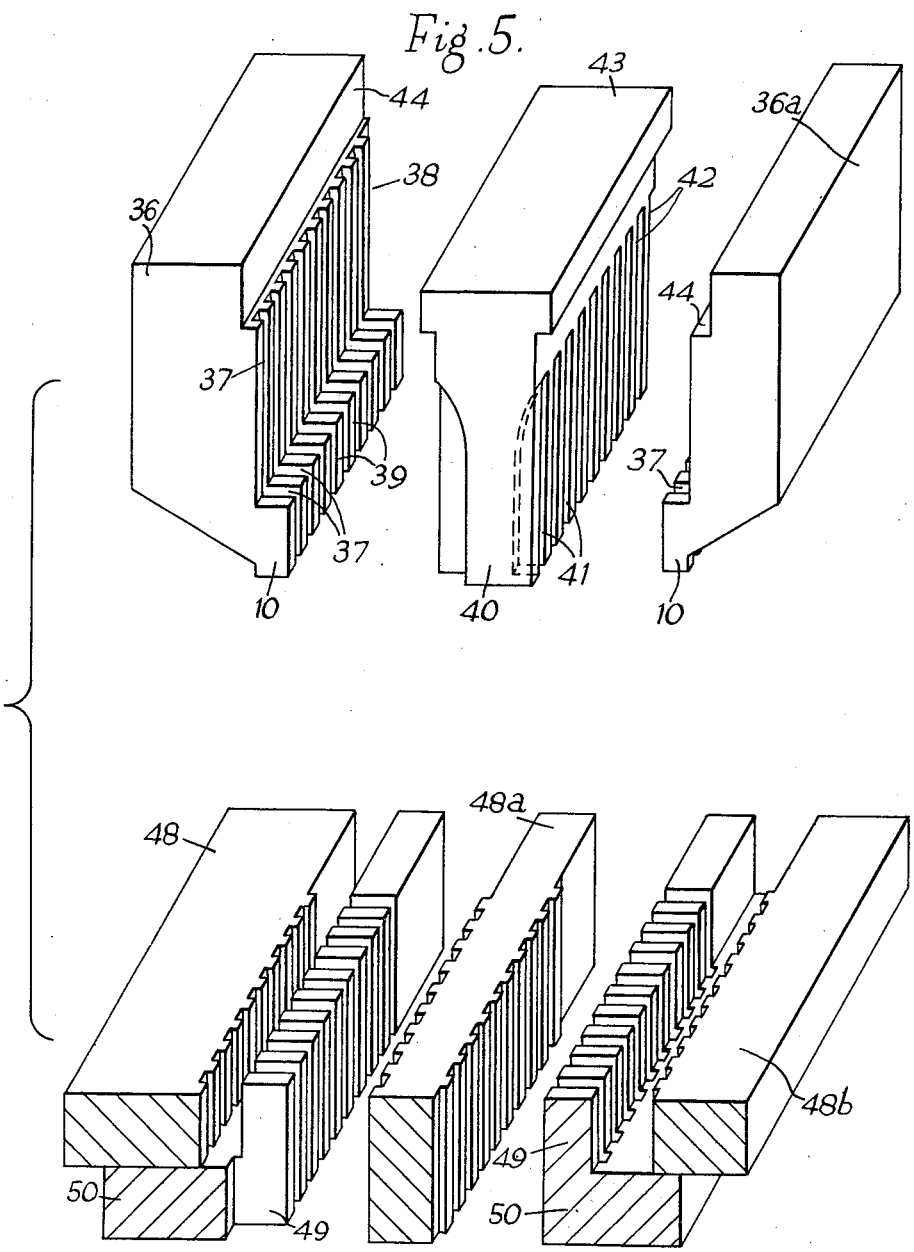

Aug. 13, 1963    J. AIRLIE    3,100,411
PRESS TOOLS
Filed Feb. 8, 1960    6 Sheets-Sheet 6
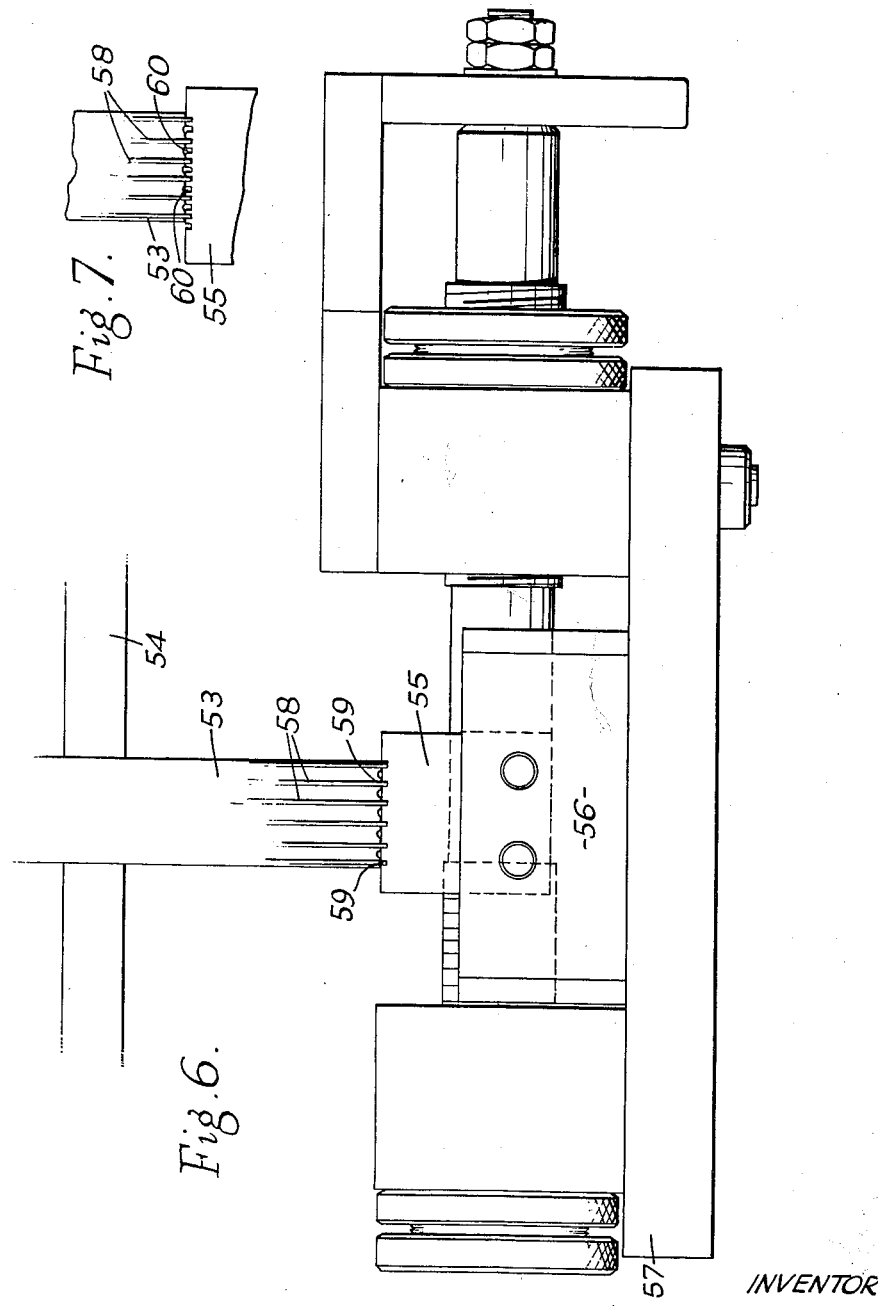
INVENTOR
John Airlie
BY
ATTORNEY

United States Patent Office 3,100,411
Patented Aug. 13, 1963

3,100,411
PRESS TOOLS
John Airlie, Glasgow, Scotland, assignor to Carrick Precision Tools Limited, a company of Great Britain
Filed Feb. 8, 1960, Ser. No. 7,419
Claims priority, application Great Britain Apr. 22, 1959
9 Claims. (Cl. 83—138)

This invention relates to press tools and is applicable to tools of the type (hereinafter referred to as "the type specified") for forming in a component a plurality of apertures arranged generally in at least one row.

Such tools have commonly been formed by assembling together a multiplicity of slotted metal strips to constitute a die, a stripper plate and a punch holder but this is a slow and costly procedure particularly when the dimensions of and the spacing between the slots are small and when they are to be sharp cornered. Furthermore since each slot in the die is preferably tapered so that the slug pushed into it by a punch may readily pass through the die without jamming and thereby wearing and blocking the slot the difficulty and expense of forming such dies is increased.

It is therefore an object of the present invention to provide an improved press tool of the type specified which is simpler and less costly than tools hitherto used particularly where a high degree of accuracy is required in the component strip and closely spaced apertures of very small size are to be punched therein.

According to one aspect of the present invention there is provided an assembly for a press tool of the type specified comprising two body portions each having upper and lower faces and a side face and being arranged with their side faces registering with one another, a corresponding series of grooves formed in the side face of each portion from the upper to the lower face thereof, the grooves being separated by ribs and accurately formed spacer elements extending between corresponding grooves of each portion to define with the outer ends of the ribs a plurality of slots extending through the assembly from the top of the bottom face thereof.

The spacer elements may have their adjacent walls formed with recesses extending from a position near the upper edge of each element to the lower edge thereof and diverging towards said lower edge, the side edges of each element and the corresponding grooves in the body portions being tapered away from the upper face of the assembly so that the assembly may constitute a die.

The spacer elements may be formed with side edges which diverge from the upper to the lower face of the assembly, corresponding grooves in the body portions being similarly tapered so that the assembly may constitute a stripper plate.

The side edges of the spacer elements and the bottoms of the corresponding grooves in the body portions may be tapered from the upper face of the assembly towards the lower face thereof and punch elements may be disposed within the slots provided between the spacer elements to extend below the lower face of the assembly. Preferably the punch elements and the outer end of the ribs on the body portions have inter-engaging formations so that the punch elements may not be withdrawn from the lower face of the assembly.

The assembly or a die, a stripper plate or a punch holder formed therefrom may be provided with a plurality of body portions, the intermediate ones of which are formed with two side faces. Advantageously the various parts of the assembly whether the latter is used as the basis for a die, a stripper plate or a punch holder are disposed on a standard bolster of a press tool and are maintained in their correct relative positions by clamps.

In a preferred form of the invention the slots in the assembly are of rectangular cross-sectional shape and the assembly is utilized to provide a die, a stripper plate and a punch holder for punching out the slots and cutters of electric shavers.

The invention also provides a method of forming the grooves in the side faces of the body portions of the assembly by a grinding operation using a grinding wheel formed with a plurality of circumferential fins the radial cross-sectional shape and size of which correspond with the radial cross-sectional shape and size of each groove to be formed thereby and the fin being axially spaced by a distance which is a multiple of the distance between corresponding parts of adjacent grooves.

The method and apparatus for forming the grooves including a diamond device for cutting, forming and periodically dressing the fins on the grinding wheel is described in the complete specification of my co-pending application No. 42,431, filed July 12, 1960.

Two embodiments of the present invention will now be described by way of example with reference to the accompanying drawings in which:

FIG. 2 is an exploded view of the elements of the tool,

FIG. 3 is a view similar to FIG. 1 of a modified form of the invention,

Figure 4:
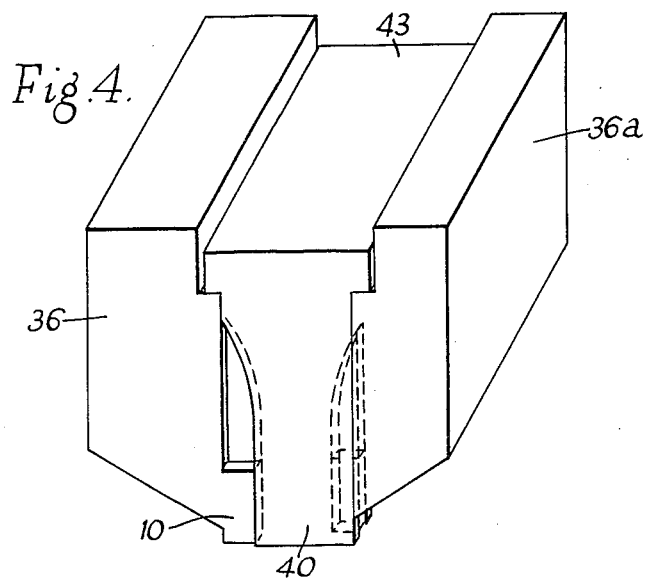
Figure 8:
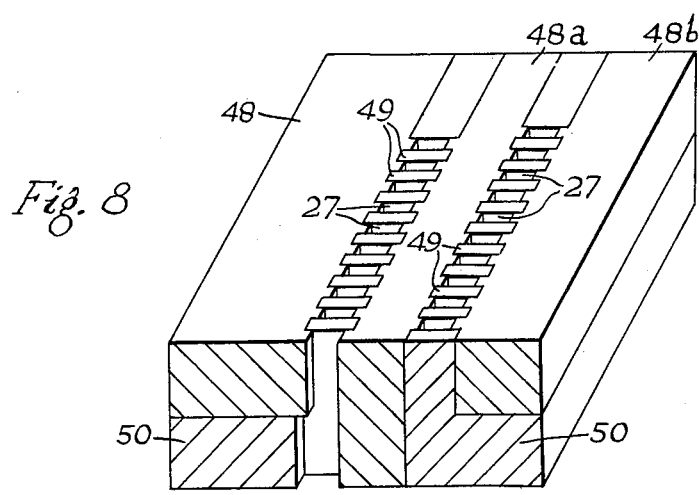

FIG. 4 shows in perspective the elements of the tool and stripper assembled together, FIG. 5 is an exploded perspective view of the elements, FIG. 6 is a diagrammatic elevational view showing a grinding wheel cutting a first series of slots in a workpiece, FIG. 7 is a fragmentary view showing how the grinding wheel cuts a second series of slots in the workpiece, and FIG. 8 shows in perspective the elements of the die assembled together.

Figure 1:
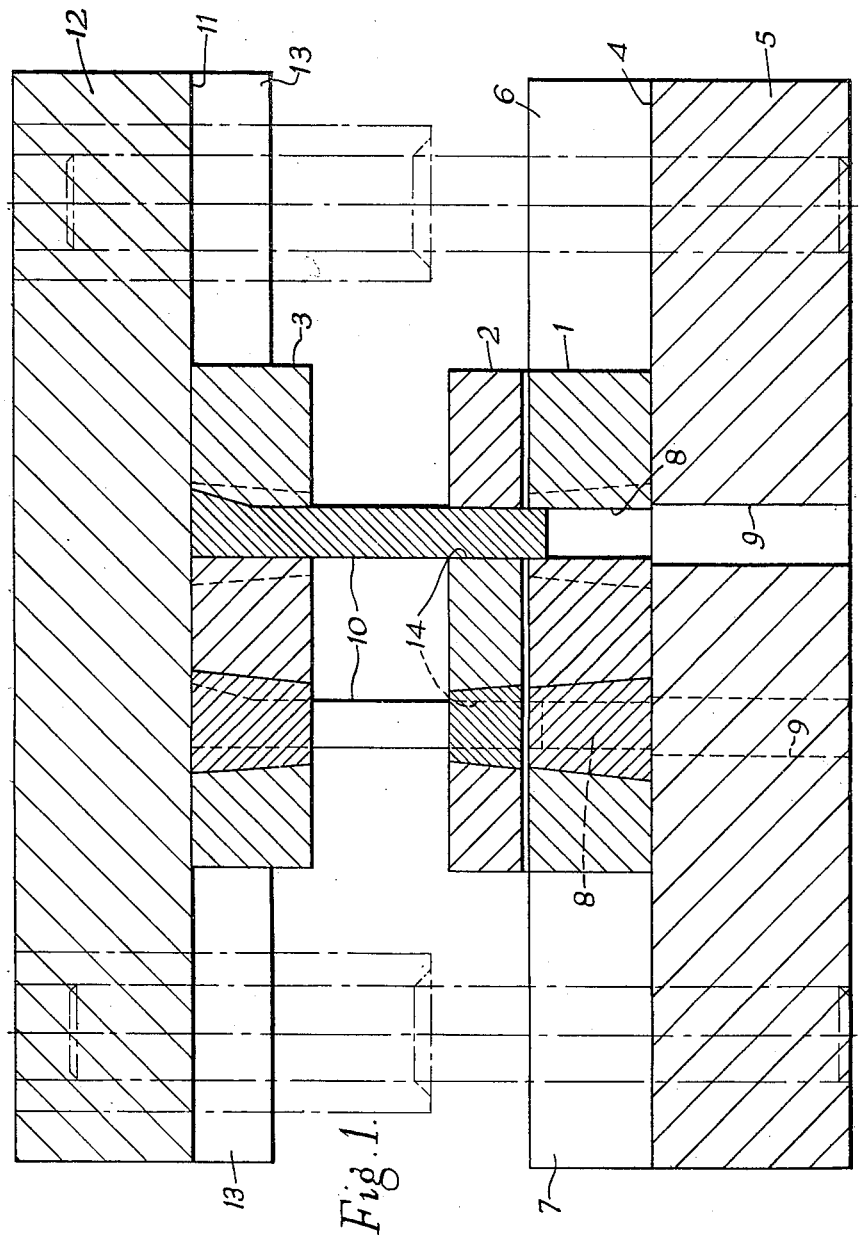
FIG. 1 is a vertical section through a press tool according to the invention.

Referring to FIG. 1 of the drawings the press tool comprises a die 1, a stripper plate 2 and a punch holder 3. The die 1 is mounted on the upper surface 4 of a bolster 5 on a press (not shown) by means of clamping elements indicated diagrammatically at 6 and 7. The die 1 comprises two rows of slots 8 and the bolster 5 is formed with apertures 9 respectively, registering with these slots for slug clearance.

The punch holder incorporates two rows of punches 10 incorporated within the slots 8 in the die 1 and is mounted on the lower surface 11 of the upper bolster 12 of the press by means of clamping elements indicated diagrammatically at 13.

The stripper plate 2 is formed wtih two rows of slots 14 and is slidable on the punches 10 to rest on top of a component strip (not shown) which is repeatedly passed across the upper surface of the die 1 in known manner.

Referring now to FIG. 2 of the drawings the die 1, the stripper plate 2 and the punch holder 3 respectively, comprise body portions 15a, 15b, 15c and 16a, 16b, 16c and 17a, 17b, 17c, and each body portion has an upper face 18 and a lower face 19. Each body portion is also formed with a side face, the body portions being assembled together so that the side faces register with one another, the juncture between adjoining side faces being indicated in FIG. 2 at 20.

Each side face is formed with a plurality of grooves 21 extending normally between the upper face 18 and the lower face 19, the grooves being separated by ribs 22, the outer ends 23 of which terminate short of the side face of the respective body portion.

Accurately formed spacer elements 24, 25, 26 are disposed between corresponding grooves of each adjacent body portion to define with the outer ends 23 of the ribs 22 a plurality of slots 27 arranged in two parallel rows.

The construction above-described constitutes an assembly according to the present invention which may form the basis for a die, a stripper plate or a punch holder.

As shown in FIG. 2 of the drawings the spacer elements 26 of the punch holder have their side edges such as 28 tapered from the upper surface 18 to the lower surface 19 of the assembly and the bottoms of the grooves 21 are similarly tapered. The punch elements 10 are of rectangular cross-section and of uniform cross-sectional area except at their upper ends where they are formed with an outwardly tapering edge 29. Corresponding ribs 22 of appropriate body portions are formed in a complementary manner. It will be appreciated that this formation ensures that the element 10 cannot be pulled through the assembly from the lower face 19 thereof.

The spacer element 25 of the stripper plate 2 has its side edges such as 30 tapered from the lower face 19 to the upper face 18 of the assembly, the lower edges such as 31 of the elements being coplanar with the lower face 19 as are the upper edges 32 with the upper faces 18 of the assembly.

The side edges such as 34 of the spacer element 24 of the die are tapered from the lower face 19 to the upper face 18 and the bottoms of the grooves in the body portions are correspondingly tapered. The walls of the element 24 are formed with recesses 35 which extend from a position near the upper face 18 to the lower face 19 and diverge towards the lower face 19 to provide clearance for slugs of material punched out of a component strip by the tool.

Referring now to FIGS. 3, 4, 5 and 8 of the drawings these show a modified construction in which the stripper plate, as a separate assembly disposed between the punch holder and the die, is omitted. As shown most clearly in FIG. 5 the punch holder 3 comprises two body portions 36 and 36a each formed integrally with a row of punches 10 which extend downwardly from the body portions. The punches 10 are separated by slots 37 extending upwardly through the face 38 of each body portion, the faces 38 being set back from the side edges 39 of the punches 10. A stripper block 40 is disposed between the body portions 36 and 36a. Opposed side faces of this block are formed with slots 41 to define ribs 42 which are of such a size and are spaced apart to afford a sliding fit within the slots 37 of the body portions 36 and 36a. The stripper block 40 is formed with a head 43 the side edges of which fit in recesses 44 of the body portions and when assembled as shown in FIG. 3 a pad 45 of resilient material such as rubber is disposed between the upper surface of the block 40 and the lower surface 11 of the upper bolster 12 of the press. As shown in FIG. 3 when the head 43 rests against the supporting surface of the recess 44 the lower surface 46 of the block 40 extends beyond the lower surfaces 47 of the punches 10.

It will be appreciated that the construction above described comprises a combined punch and stripper assembly which could if desired be employed with the die assembly shown in FIG. 2 of the drawings. However a preferred form of die assembly is shown in FIGS. 3, 4, 5 and 8 and this comprises body portions 48, 48a and 48b broadly corresponding with the portions 15a, 15b and 15c in FIG. 2 which are separated when assembled together by spacer elements 49 corresponding with the spacer elements 24 of FIG. 2. Further in the construction of FIG. 3, 4, 5 and 8 each row of spacer elements is formed integrally with blocks 50. As shown most clearly in FIG. 3 of the drawings the ribs 22 of the body portions 48, 48a and 48b are downwardly tapered as at 51 and in addition the side faces of the spacers 49 may also be formed with recesses such as those shown at 35 in FIG. 2 to permit clearance for slugs of material punched out of a component strip such as 52 (FIG. 3).

In operation, as shown in FIG. 3, as the bolster 12 moves downwardly the component strip 52 is first engaged by the lower surface 46 of the block 40, further movement of the bolster causing the punches 10 to cut slots in the strip in co-operation with the slots 27 of the die assembly. During this further movement of the bolster 12 the block 40 is held firmly against the component strip 52 by compression of the pad 45 and upon return movement of the bolster 12 to secure the punches 10 from engagement within slots 27 of the die the lower surfaces 46 of the block 40 is not moved out of engagement with the strip 52 until the lower ends 47 of the punches 10 are well clear thereof.

All the solid elements of each assembly of the construction of FIGS. 1 and 2 and all the elements of each assembly of FIGS. 3, 4, 5 and 8 may be appropriately grooved or slotted by a grinding wheel. FIG. 6 of the drawings shows diagrammatically a grinding wheel 53 mounted on a shaft 54 in co-operation with a workpiece 55 mounted in a holder 56 on a table 57. It will be assumed that the workpiece 55 is to constitute one of the slotted elements of the construction of FIGS. 1 and 2 or FIGS. 3, 4, 5 and 8 but no attempt has been made in this figure to illustrate the workpiece in detail or the grinding apparatus since the figure is purely diagrammatic to show the particular way in which very fine slots which are closely spaced together may be accurately ground. The wheel 53 has six circumferential fins 58 the radial cross-sectional shape and size of which correspond with the cross-sectional shape and size of each groove to be formed thereby in a plane normal to the length of the groove and the axial spacing of the fins 58 is double the required groove spacing. As shown in FIG. 6 the first grinding operation causes a series of grooves 59 to be formed in the workpiece 55 and thereafter the table 57 is moved axially relative to the grinding wheel 53 by any suitable indexing mechanism and as shown in FIG. 7 a further series of grooves 60 is then ground by the fins 58 at appropriate positions between the grooves 59. It will be appreciated that although as described and illustrated the axial spacing of the fins 58 is always the required spacing between the grooves in the workpiece this spacing could be any suitable multiple of the required spacing of the grooves.

Desirably the apparatus for forming the slots in the workpiece incorporates diamond cutting elements capable of forming and repeatedly dressing the fins 58 on the wheel 53. Such apparatus and its method of operation is disclosed in my co-pending application No. 42,431, filed July 12, 1960.

I claim:

1. For a press tool capable of forming in a component a plurality of apertures arranged generally in at least one row a part comprising first and second body portions, upper, lower and side faces on each body portion, the said body portions being arranged with their side faces registering with one another, means to maintain said side faces in opposed relationship, a corresponding series of grooves formed in the side face of each body portion from the upper to the lower faces thereof, a base for each groove, ribs separating the grooves, outer end faces of the ribs and a plurality of accurately formed spacer elements each extending between the bases of corresponding grooves on each body portion to define with the outer end faces of said ribs a plurality of slots extending through said press tool part from the top to the bottom thereof.

2. A part for a press tool according to claim 1 in which said ribs terminate short of their associated side face.

3. For a press tool capable of forming in a component a plurality of apertures arranged generally in at least one row a part comprising first and second body portions, upper, lower and side faces on each body portion, the said body portions being arranged with their side faces registering with one another, means to maintain said side faces in opposed relationship, a corresponding series of grooves formed in the side face of each body portion from the upper to the lower faces thereof, a base for each groove, ribs separating the grooves, outer end faces of the ribs and a plurality of accurately formed spacer elements each extending between the bases of corresponding grooves on each body portion to define with the outer end faces of said ribs a plurality of slots extending through said press tool part from the top to the bottom thereof, recesses being formed in adjacent side walls of said spacer elements from a position near the upper edge of each element to the lower edge thereof and diverging towards said lower edge, the side edges of each element and the corresponding grooves in said body portions being tapered away from said upper face of the press tool part so that the latter may constitute a die.

4. For a press tool capable of forming in a component a plurality of apertures arranged generally in at least one row a part comprising first and second body portions, upper, lower and side faces on each body portion, the said body portions being arranged with their side faces registering with one another, means to maintain said side faces in opposed relationship, a corresponding series of grooves formed in the side face of each body portion from the upper to the lower faces thereof, a base for each groove, ribs separating the grooves, outer end faces of the ribs and a plurality of accurately formed spacer elements each extending between the bases of corresponding grooves on each body portion to define with the outer end faces of said ribs a plurality of slots extending through said press tool part from the top to the bottom thereof, side edges on said spacer elements diverging from the upper to the lower face of said press tool part and corresponding grooves in said body portions being similarly tapered so that the part may constitute a stripper plate.

5. For a press tool capable of forming in a component a plurality of apertures arranged generally in at least one row a part comprising first and second body portions, upper, lower and side faces on each body portion, the said body portions being arranged with their side faces registering with one another, means to maintain said side faces in opposed relationship, a corresponding series of grooves formed in the side face of each body portion from the upper to the lower faces thereof, a base for each groove, ribs separating the grooves, outer end faces of the ribs and a plurality of accurately formed spacer elements each extending between the bases of corresponding grooves on each body portion to define with the outer end faces of said ribs a plurality of slots extending through said press tool part from the top to the bottom thereof, the side edges on said spacer elements and the bottoms of the corresponding grooves in said body portions being tapered from the upper face of the press tool part towards the lower face thereof, and punch elements being disposed within the slots provided between said spacer elements to extend below said lower face of the press tool part.

6. A press tool part according to claim 5 in which said punch elements and the outer end faces of the ribs on the body portions have inter-engaging formations so that said punch elements may not be withdrawn from said lower face of the press tool part.

7. For a press tool capable of forming in a component a plurality of apertures arranged generally in at least one row a part comprising first and second body portions, upper, lower and side faces on each body portion, the said body portions being arranged with their side faces opposing each other, a corresponding series of grooves formed in the side face of each body portion from the upper to the lower faces thereof, ribs separating the grooves and accurately formed spacer elements extending between corresponding grooves on each body portion to define with the outer ends of said ribs a plurality of slots extending through said press tool part from the top to the bottom thereof, and punch elements formed integrally with said ribs in lower part of said body portions.

8. A part for a press tool according to claim 7 in which a stripper block is slidably disposed between said body portions and carries a plurality of said spacer elements slidable in the grooves of the body portions and movable relative thereto under the action of resilient means.

9. For a press tool capable of forming in a component a plurality of apertures arranged generally in at least one row a part comprising first and second body portions, upper, lower and side faces on each body portion, the said body portions being arranged with their side faces registering with one another, a corresponding series of grooves formed in the side face of each body portion from the upper to the lower faces thereof, ribs separating the grooves and accurately formed spacer elements extending between corresponding grooves on each body portion to define with the outer ends of said ribs a plurality of slots extending through said press tool part from the top to the bottom thereof, said spacer elements being formed integrally with a block so that said press tool part constittutes a die.

References Cited in the file of this patent
UNITED STATES PATENTS

| | | |
|---|---|---|
| 407,242 | Quinn | July 16, 1889 |
| 1,302,249 | Vogetzer | Apr. 29, 1919 |
| 2,144,987 | Miller | Jan. 24, 1939 |
| 2,169,937 | Wempe | Aug. 15, 1939 |
| 2,419,457 | Mahlmeister | Apr. 22, 1947 |